United States Patent [19]

Solomon

[11] Patent Number: 4,844,805
[45] Date of Patent: Jul. 4, 1989

[54] REVERSE OSMOSIS ELEMENT

[75] Inventor: Donald F. Solomon, Hemet, Calif.

[73] Assignee: Wetco of Delaware, Inc., Decatur, Ga.

[21] Appl. No.: 74,570

[22] Filed: Jul. 17, 1987

[51] Int. Cl.⁴ ............................................. B01D 13/00
[52] U.S. Cl. ............................... 210/321.82; 210/346; 210/358; 210/433.1; 210/486; 210/490; 210/506
[58] Field of Search ............... 210/247, 248, 346, 358, 210/433.1, 321.82, 486, 487, 490, 506, 517.1

[56] References Cited

U.S. PATENT DOCUMENTS

| | | | |
|---|---|---|---|
| 3,133,132 | 5/1964 | Loeb et al. | 210/500.3 |
| 3,202,284 | 8/1965 | Wade | 210/346 |
| 3,344,214 | 9/1967 | Manjikian et al. | 264/217 |
| 3,367,504 | 2/1968 | Westmoreland | 210/321.83 |
| 3,397,790 | 8/1968 | Neuby et al. | 210/487 |
| 3,508,994 | 4/1970 | Nyrop | 210/321.84 |
| 3,544,358 | 12/1970 | Monjikian | 210/490 |
| 3,612,282 | 10/1971 | Cheng | 210/321.9 |
| 4,299,702 | 11/1981 | Bairinji et al. | 210/321.83 |

Primary Examiner—W. Gary Jones
Attorney, Agent, or Firm—Quirk, Tratos & Roethel

[57] ABSTRACT

A reverse osmosis water purification module has an enclosed cylindrical housing in which at least twelve purification elements are mounted in a uniform, spaced parallel fashion. Each element consists of a long flat member having a thermoplastic sheet backing formed into a slightly curved cross section and having a semi-permeable membrane disposed thereon. The backing has three-dimensional porosity for purified water such that water passing through the membrane portion of the element travels along the backing member to an end. The ends of the module are mounted in a collection manifold which is sealed off from the remainder of the housing interior. A method of manufacturing the elements continuously is also provided wherein a continuous length of flexible backing material is fed sequentially through a heater, a forming die to impart a curved cross-section to the backing material, an extruder wherein membrane forming fluid is extruded around the periphery of the backing, a chill bath and a heating bath. After passing through the various process steps, the continuous length of material is cut into elements of desired lengths.

9 Claims, 5 Drawing Sheets

REVERSE OSMOSIS ELEMENT

BACKGROUND OF THE INVENTION

This invention relates to elements mounted in a cartridge for separating pure water from brine. More particularly, it relates to elements having a reverse osmosis membrane disposed entirely around the surface of a backing member which is porous throughout its length, width, and depth but which has sufficient structural strength to support the membrane. In addition, the invention relates to a method of manufacturing elements which comprises sequentially feeding a continuous strip of backing material through a heater and cold iron to provide a curved cross-section to the material, passing the material through an extrusion nozzle to extrude a reverse osmosis membrane on the backing material, passing the coated material sequentially into a chill bath and a heat treatment bath, cutting the material into discrete units and soaking the units in glycerine.

The use of semi-permeable membranes to separate liquids from salts dissolved therein is a well-known, commercially practiced technique. In recent years, the use of units in the home to purify water for drinking, ice making, and the like has become quite prevalent. Units used in the home are generally relatively small, since they must be placed underneath a sink or in other confined spaces, yet must maintain sufficiently high throughput to provide an adequate supply of purified water. Accordingly, it is necessary to design a unit which reasonably maximizes the membrane surface area per unit of volume of the cartridge, since the volume of purified water produced by a membrane element is generally directly proportional to the surface area of the membrane in contact with the brine.

It is common for membrane elements to be mounted in parallel fashion within a cylindrical cartridge, with purified water being collected in a header or manifold at one portion of the container, and with brine passing through the container around exterior surfaces of the membranes. Cheng, U.S. Pat. No. 3,612,282 and Manjikian, U.S. Pat. No. 3,544,358, are examples of such systems. Many other mounting configurations, such has spiral mounts of the type shown in Westmoreland, U.S. Pat. No. 3,367,504, Bray, U.S. Pat. No. 3,417,870, and Bairinja, U.S. Pat. No. 4,299,702, are also well-known. Difficulties have been encountered with spiralwrapped membranes in that separating members between helical wraps impede the flow of brine and also plug the membrane with salt. As a consequence, feed water must be filtered prior to feeding into a spiral-wrapped membrane. In addition, these membranes are relatively costly to manufacture and assemble. Also, in the past, in order to provide sufficiently dilute brine to the membrane surface, it has been necessary to have a continuous flushing of brine through the cartridge, resulting in a wasting of water. Continuous flushing of reverse osmosis units to drain has been criticized by many water districts and is expected to be precluded by law in a number of areas.

A substantial pressure drop is required across the reverse osmosis membrane, thus providing the driving force for separating the pure water from dissolved salts. The membrane itself, however, is quite delicate and is required to be supported to withstand the pressure. The support must be sufficiently strong to resist deformation by the external pressure, but must also be permeable to permit the flow of pure water passing through the membrane to be conducted into a collection chamber for usage. Resistance to passage of purified water through the porous membrane support will of course hinder the flow of water through the membrane, thus decreasing throughput of the element. Accordingly, much research has been done to discover a optimum element design. Many commercial units designed for purification of residential water have membranes cast over tubular backings, with water being collected inside the tube and being passed to a collection chamber.

In the present invention, a reverse osmosis element is made from a backing consisting of a stiff piece of porous plastic on which a reverse osmosis membrane has been cast. The element is porous laterally, longitudinally, as well as transversely; i.e., the backing is porous in three dimensions and water may travel in any direction through the backing once it has passed through the membrane. The membrane is cast around the entire periphery of the backing, and when it is mounted in a cartridge, the water passes through the membrane and into the backing, and travels along the backing toward one end which is mounted in a manifold. The elements may be arranged in a plurality of different geometrical configurations within the cartridge; since the elements are flat and have a slightly curved cross-section, they are mounted in configurations similar to the vanes in a turbine, thus providing relatively turbulent flow around both sides of the element and providing good scouring of the blade surfaces. Because the elements themselves are relatively rigid, they may be mounted in a cartridge without spacers which would touch the elements and possibly provide breaks therein when salts accumulate.

Elements of the invention are manufactured by feeding a continuous band of thermoplastic material and passing it through a heater to soften the material and then through an iron which sets the material to a desired curved cross-section. The band passes from the iron into an extruding nozzle within which a reverse osmosis membrane is extruded onto the surface of the backing, completely coating all peripheral areas. The coated backing is then passed through a chill bath to set the membrane, and a heating bath to heat treat the solid membrane. The band may then be cut into discrete elements and subsequently treated to remove water molecules from the element, e.g., with a glycerine bath. The elements are then mounted in parallel fashion in a cartridge in any of a variety of manners, some of which are described herein.

Accordingly, it is an object of the present invention to provide a reverse osmosis water purification system which is inexpensive to manufacture, and which has a relatively low failure rate of membrane in service. It is a further object of the invention to provide a reverse osmosis element consisting of an elongate flat member having a slightly curved cross-section consisting of porous backing entirely coated with a reverse osmosis membrane. It is yet a further object of the invention to provide a reverse osmosis cartridge having a plurality of flat curved elements mounted generally parallel therein, with one end of the elements extending through a header and into a collection chamber wherein purified water passing through the membrane backing is collected. It is yet a further object of the invention to provide a continuous method of manufacturing the discrete membrane elements having a backing consisting of a flexible plastic band. These and other objects are accomplished by the invention, several preferred embodiments of which are described herein.

BRIEF SUMMARY OF THE INVENTION

A reverse osmosis element consists of an elongate flat plastic backing member having three dimensional porosity having a reverse osmosis membrane cast around the entire periphery thereof. The element has a curved transverse cross-section. The element is mounted in a cartridge with a number of other like elements mounted generally in parallel configuration. Water passes through the membrane to the porous backing, and travels along the backing to one end of the element which is mounted in or adjacent to a collection chamber. A method of manufacture is also provided in which a continuous band of thermoplastic porous material is passed through a heater, an iron, a membrane extruding nozzle, chill and heat baths, and a cutter.

BRIEF DESCRIPTION OF THE DRAWINGS

The invention is best understood with reference to the drawings, in which.

DESCRIPTION OF A PREFERRED EMBODIMENT

Figure 1:
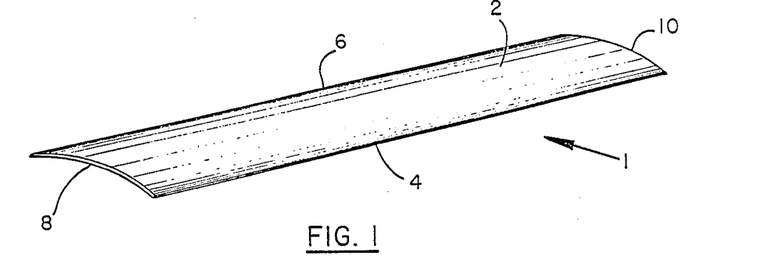
FIG. 1 is a perspective view of an element of the invention.
Figure 2:
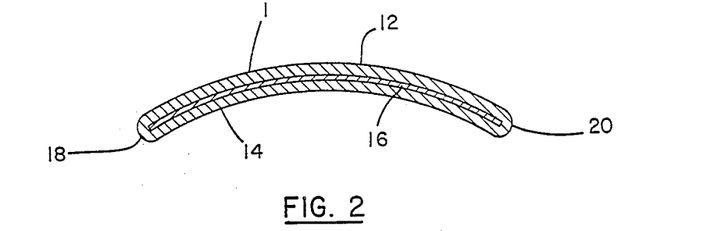
FIG. 2 is a transverse cross-section thereof.

Referring first to FIGS. 1 and 2, reverse osmosis purification element 1 is a generally flat, semirigid member 2 having a slightly curved transverse cross-section. The element has opposing side edges 4 and 6, and opposing ends 8 and 10. As shown in FIG. 2, element 1 consists of an internal backing member 16 which is entirely coated around its peripheral surface (except the ends thereof) with a reverse osmosis membrane. The membrane has an upper surface 12 and lower surface 14, and is slightly beaded as shown at 18 and 20 along the elongate edges 4 and 6 to protect against any fuzz or sharp edges which might create faults in the membrane, thereby permitting leakage of impure water into the interior collecting portion of the element.

The term "slightly curved" is intended to include both uniform and irregular curvatures; the cross-section is preferably not flat but is arcuate in the manner of a decorative "mini-blind" or turbine blade as shown in FIGS. 1-4 and 7. The curvature provides structural strength, allows a higher area per unit volume of cartridge, and provides improved flow patterns through the unit. The curvature is generally defined by an arc subtended by radii between about 10° and 60°, preferably between about 20° and 45° of circumference. Each element may be made as long and wide as desired, but the thickness is very small relative to the other dimensions. Typically, for the elements depicted in FIGS. 1-4, 7, and 11, the thickness is less then about 5% of the width, and less than 0.5% than the length.

Figure 8:
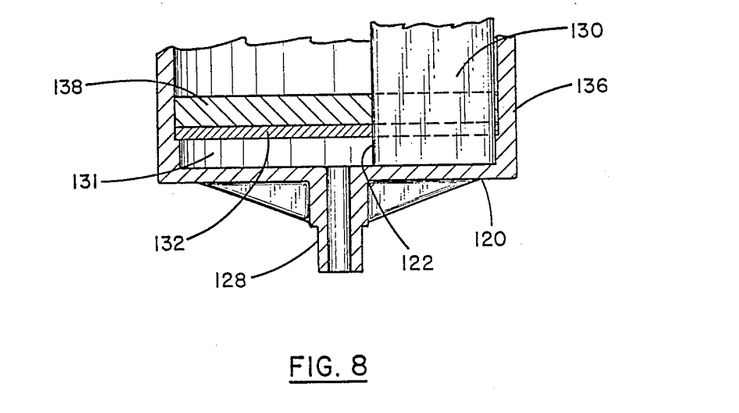
FIG. 8 is a partial side-section view showing mounting of elements of the invention in the header shown in FIG. 7.

The backing member 16 may be any material which can have a sufficient amount of structural strength and which is porous to water in three dimensions; i.e., water traveling through the membrane can pass along the backing either longitudinally, laterally (across the width of the membrane), and transversely (through the thickness of the membrane). Because of the porosity feature, pure water passing through the membrane reaches the backing and can travel along the backing to one end thereof for collection. One method of collecting the water is shown in FIG. 8.

The term "semi-rigid" when applied to membranes of the invention is intended to describe an element having at least sufficient structural rigidity and stiffness to stand upright without flexing without exterior support except at the bottom for balance. While the backing materials and membranes themselves are relatively flexible, stiffness is created by forming the flat backing material into a slightly arcuate or crescent-shaped cross-section, adding some structural strength to the backing. Element stiffness is important so that when a plurality of elements are mounted in close relationship inside a cartridge, the elements do not flex or sag, particularly under water flow, and touch other membranes, possibly creating areas of salt accumulation and membrane damage. Accordingly, the membranes must be sufficiently stiff so as not to contact adjacent membranes when mounted in a cartridge. If desired, the membranes may be made completely rigid or stiff, although this is not necessary. Suitable membrane backing materials include "Simplex", manufactured by Hornwood Fabrics of Lylesville, N.C., which is a melamine or epoxy-impregnated polyester material which is porous in three dimensions. Another suitable material is a "Trecot" polyester-impregnated melamine also manufactured by Hornwood Fabrics. Other suitable backing materials are porous thermoplastics such as polypropylene, UHMW and HD polyethylene, polyvinylidene fluoride, ethylene-vinylacetate, styrene-acrylonitrite, and polytetrafluoroethylene. These materials are commercially available under the "Porex" trademark from Porex Technologies of Fairburn, Ga. Typical element dimensions include lengths of about 6"–36", preferably 8"–20" and widths of 1"–2" depending on water production rate required. These elements can easily be mounted in parallel in conventional cylindrical housing. Typically, the thickness of the backing is less than about 40 mils and ranges from about 10 mils for Trecot and 32 mils for Porex. Thickness of the membrane coating usually runs from about 3 mils to about 7 mils, and is preferably 5–6 mils, thus making the maximum desired element thickness of about 50 mils. Any semi-permeable membrane film may be used to coat the backing according to the invention; many reverse osmosis membrane materials are well known and commercially available, including the cellulose acetate films disclosed in Loeb et al., U.S. Pat. No. 3,133,132, and Manjikian, U.S. Pat. No. 3,344,214. The membranes are preferably cast onto the elements as a viscous liquid in the manner described hereinafter.

Figure 3:
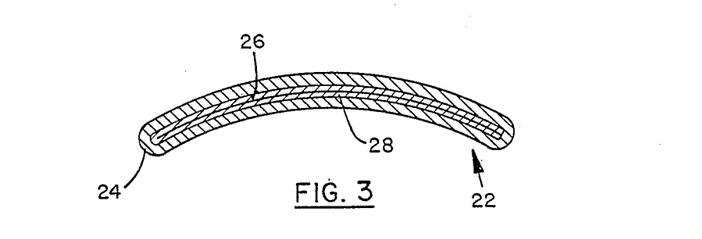
FIG. 3 is a transverse cross-section of another embodiment of the element of the invention.
Figure 4:
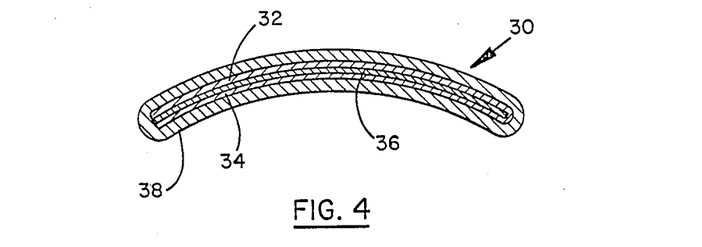
FIG. 4 is a transverse cross-section of an embodiment of the invention different from the one shown in FIGS. 1 and 3.

FIG. 3 shows a different embodiment of an element of the invention from the one shown in FIG. 1, in that the backing material is doubled (i.e., folded over) prior to application of the membrane. The backing, which may be a porous polyester such as Simplex or Trecot, is folded longitudinally into two layers 26 and 28. The membrane 24 coats the entire periphery of the backing. Purified water passing through the membrane can travel either along the interstices of the backing material or along the cavity between the folded layers 26 and 28. A similar embodiment is shown in FIG. 4, in which element 30 is fabricated from a folded backing member having panels 32 and 34, which are mounted in a "sandwich" around a porous fabric member 36. Blotter 36 is a very porous material which permits three dimensional flow of water with virtually no resistance at the flow rates contemplated by the invention. A membrane 38 coats the entire peripheral surface of the element along its entire length. One or more openings in the membrane at either or both ends thereof permits collection of the purified water.

Figure 5:
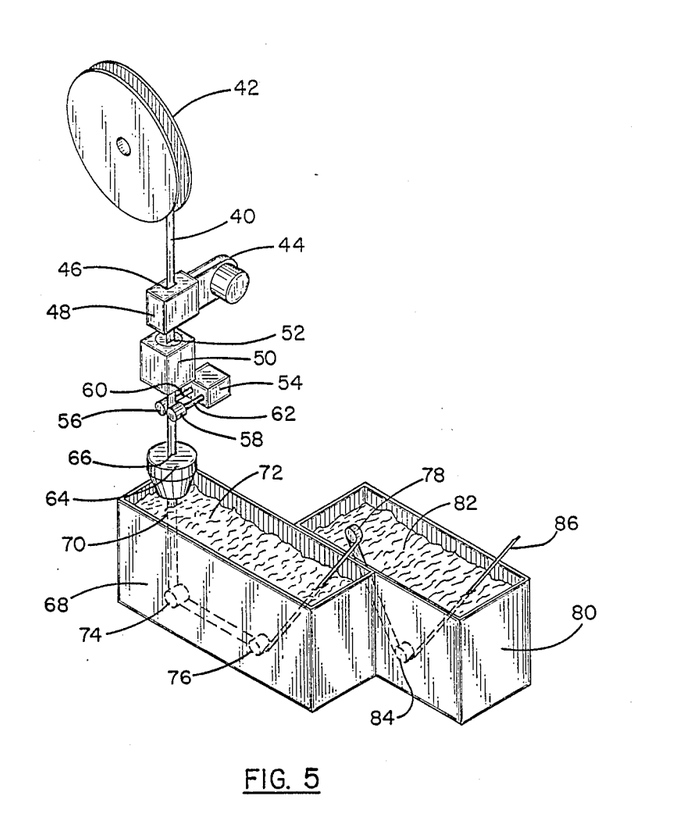
FIG. 5 is a descriptive diagram showing the process of manufacture of elements of the invention.

Manufacture of elements of the invention is shown in the schematic diagram of FIG. 5. The backing material for the element 40 is maintained on a reel 42, thus providing a continuous supply of material. The backing material 40 is fed through a heating element 44 having a slot in block 48 of the heater through which the backing material passes. The sole purpose of the heater is to warm the backing material to a temperature of about 275°–325° F., preferably about 300° F. The heater is a simple resistance heating element and an air fan, similar to a portable hair dryer; any type of heater sufficient to warm the backing to this temperature can be used.

After exiting the heater 44, the backing material passes into a cold iron 50 which consists of a pair of opposing mated Teflon coated jaws (shown as slot 52) which form the heated elongate backing material to provide an arcuate transverse cross-section. In effect, the iron acts as a simple die to shape the band of material. The backing material is pulled through the heater and the die 50 by means of a drive unit 54 which consists of a pair of rollers 56 and 58 mounted on shafts 60 and 62. The rollers have a resilient surface which grasps the band of backing material, pulling it downwardly. Because the material has cooled sufficiently from passing through the iron, the drive unit does not deform the cross-section of the backing material.

The backing material passes into a slot 66 in an extrusion nozzle 64 within which viscous membrane-forming material is extruded onto the backing material. The purpose of the extruding nozzle is simply to apply an even coat of membrane onto the backing; the particular design of the extrusion nozzle is not critical and can easily be designed by someone skilled in the art. If desired, the nozzle can be shaped to extrude beaded edges along the elongate edges of the band as shown in FIG. 2.

Coated backing 70 passes downward from extruder 64 into a chill bath 68 which contains circulated water 72 at a temperature of from about 33° F. to about 37° F. The purpose of the chill bath is to form the membrane from the membrane solution. The chill bath is preferably equipped with a vent to remove volatile elements. The chill bath is equipped with a recirculating system including a pump, a thermostat-controlled cooling element, and a filter to remove any particulate matter.

The coated band passes over guide rollers 74 and 76 continuously, and over a third guide roller 78 mounted above the bath, and into a heat treatment bath 80. The heat treatment bath contains water at a temperature of at least about 110° F., preferably from 120° F. to about 180° F. for the purpose of shrinking the membrane and improving the selectivity of the membrane. The heat-treated band passes over a fourth guide roller 84, and exits the bath as treated element precursor 86. The element then passes to a cutter which separates transversely the coated backing material into elements of a desired length. The discrete elements are then treated in a glycerine bath (20% glycerine in de-ionized water) to displace trapped water in the element, permitting the element to be stored at temperatures at which the water would freeze and damage the membrane. The bath is maintained at room temperature, and the residence time of the element in the bath is at least about ½ hour. Both the cooling and heating baths are equipped with a bleed drain to continuously remove a small portion of the bath to maintain consistent low level of dissolved solids and contaminants from the casting solution. An equivalent amount of non-contaminated water continuously replaces the fluid removed in the bleed system.

The travel rate of the band of backing material through the process of the invention is generally controlled by the extrusion element; extrusion is the slowest and most delicate part of the process. If the extrusion operates too rapidly, uniform coating may not occur, and if it operates too slowly, the viscous treatment material may deform prior to entering the chill bath. Since the travel rate of the band is controlled by the extrusion step, the size of the chill bath and the heating bath is controlled to provide a residence time of the element of from about 15 seconds to about 2 minutes, preferably about 1 minute, in the chill bath and in the heating bath from about 1 minute to about 5 minutes, preferably about 1.5 minutes.

Figure 6:
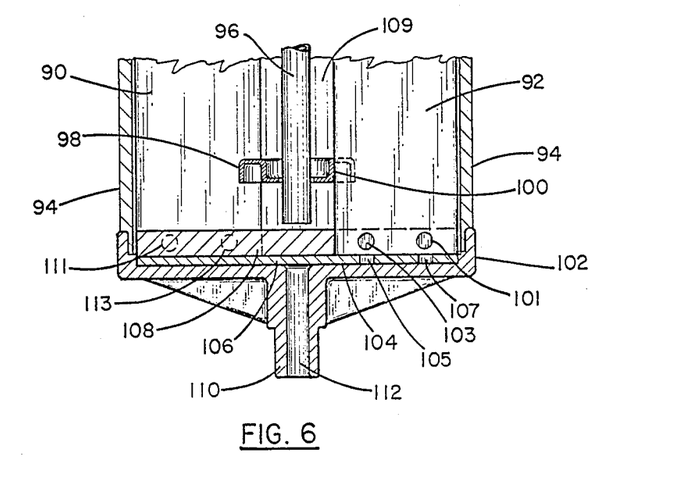
FIG. 6 is a partial sectioned view showing the mounting of elements of the invention in a cartridge.

FIG. 6 shows one method of mounting elements of the invention in a cartridge. Elements 90 and 92, of the type shown in FIGS. 1 and 2, are mounted in a cylindrical tubular housing 94. At least 12, and preferably at least 20 elements are mounted in the housing. A central mounting support tube 96 extends along the axis of the cylindrical housing, and has a pair of mounting clips 98 and 100 having fingers which extend on either side of the tubing to support the tube. In most installations, the mounting clips will not be needed as the stiffness of the elements enable them to maintain a vertical position without additional support. In addition, the central support tube may be eliminated. The lower ends of each element abut a layer of fibrous material 106 which is porous and permits the passage of water through the end of the element and into the conduit 112 of the purified water discharge nipple 110. The fibrous pad or blotter 106 rests on the upper surface 104 of header 102, and is sealed from the interior chamber 109 of the housing by potting material 108. Elements are mounted in the header by aligning them in the desired configuration with the ends of each element abutting the fibrous pad 106, and pouring in a sealing means such as a liquid potting material (which may be an epoxy or other thermosetting resin material) which precludes impure water in the interior of the housing from contaminating purified water which passes through the conduit 112.

Figure 7:
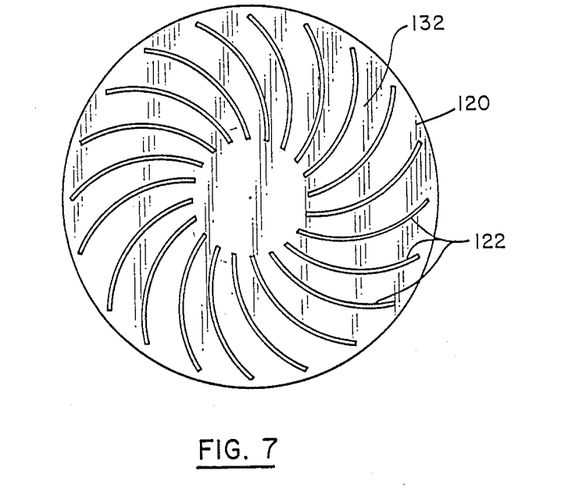
FIG. 7 shows a top-plan view of a header adapted for mounting elements of the invention.

FIG. 7 shows a top view of a header into which elements of the invention are mounted prior to enclosing within the housing of a reverse osmosis purification cartridge. The header 120 has a plurality of slots 122 therein which can receive elements of the invention.

Elements are placed in the slots as part of the manufacturing process of the cartridge. FIG. 8 shows a partial side sectioned view of the header of the invention shown in FIG. 7, with an element 130 being mounted in the slot 122. The bottom wall of the header and the interior shelf 132 form a chamber 131 for collection of purified water. The end of the element 130 extends through the slot 122 and into the chamber so that water passing through the membrane of the element travels to the bottom portion of the element and into the chamber 131, ultimately passing through conduit 128 for collection. After all of the elements are in place in the header, the potting material 138 is poured in to seal the interior of the housing of the cartridge from the collection chamber.

Figure 9:
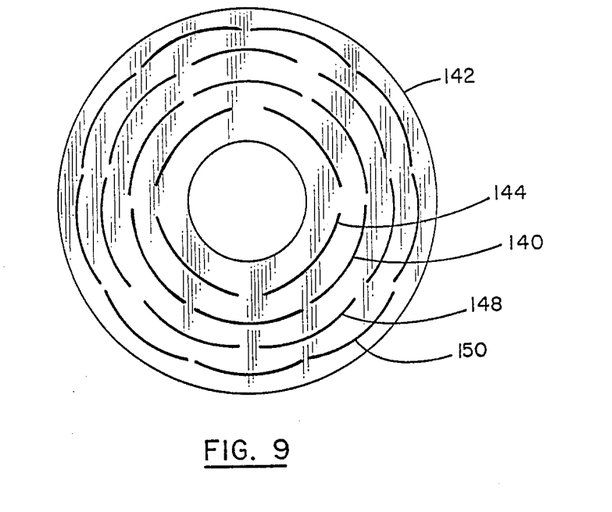
FIGS. 9 and 10 show other mounting configurations of elements of the invention within a cartridge.
Figure 10:
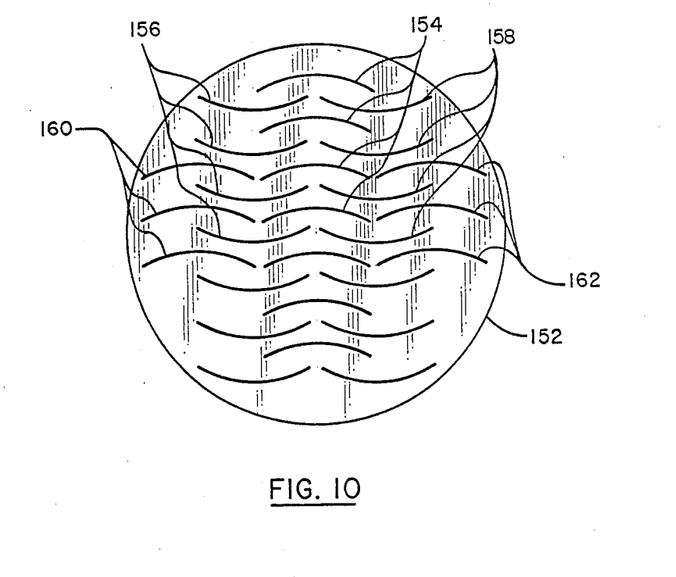

FIGS. 9 and 10 show other embodiments having different slot locations in the bottom header into which the elements are mounted. In FIG. 9, a generally concentric design is shown in which the header 142 has a plurality of generally concentric rings of elements 144, 146, 148, and 150.

In FIG. 10, header 152 has several rows of elements in which the curve surfaces are opposing. A row 154 of parallel elements extends across a central portion of the cartridge. Interspersed between and offset from row 154 are opposing rows 156 and 158, dished upwardly in the drawing. Outer rows 160 and 162 have three parallel elements facing in a downward direction in the drawing. This arrangement provides for good scouring of the elements when feed water passes through the elements in turbulent flow, for instance, in a situation where the cartridge is mounted in line in cold water service in a residence, where operation of a faucet or a toilet would create substantial flow through the unit.

Figure 11:
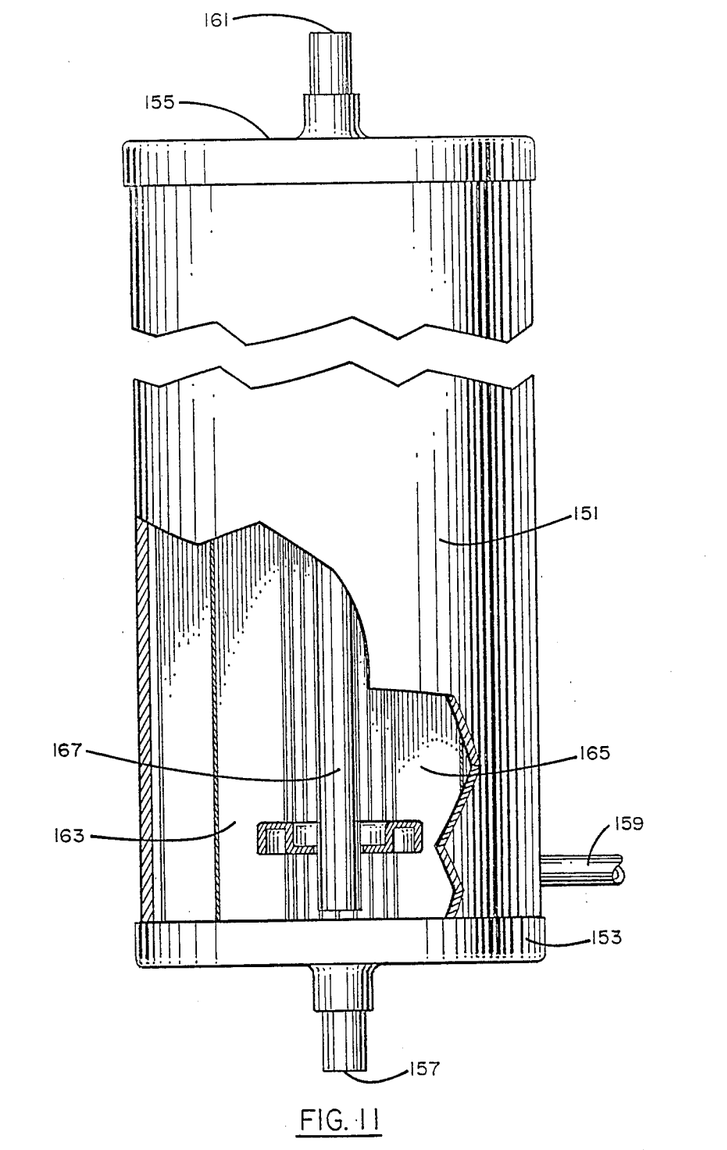
FIG. 11 is a side section view showing diagramatically the mounting of elements of the invention in a cartridge.

A schematic diagram showing mounting of the elements (in the configuration shown FIG. 7) in a cartridge is shown in FIG. 11. Cylindrical cartridge 151 has end cap closures 153 and 155. The water inlet 159 is located in the side of the cartridge, permitting tangential inflow of the water. Purified water is collected in a manifold as previously described and exits through nipple 157. Brine outlet 161 is shown in the top closure but may be located in the cartridge tangentially as is inlet 159 to provide for turbulent flow ("turboflushing" action) of water through the cartridge. These cartridges are commonly mounted in a cold-water line in a residence such that when a valve is opened downstream (e.g., by opening a faucet or flushing a toilet), rapid flow through the cartridge takes place. The various elements (e.g., 163 and 165) are mounted on a center tube support 167. When the unit is mounted under a sink, the cartridge is mounted with the purified water outlet at the top of the cartridge (i.e., upside down from the drawing in FIG. 11); this orientation permits proper stratification of the feed water, which enters near the top of the unit and proceeds downwardly as the salt concentration increases. In addition, any air that penetrates the membrane proceeds directly through the collection system and is removed as the system is used (i.e., as purified water is drawn from the collection tank).

Modifications and adaptations in the elements of the invention will be readily apparent to those skilled in the art. Accordingly, the invention should not be considered limited by the foregoing description of a preferred embodiment thereof, but rather shall be defined only by the following claims as construed to their fullest legal extent.

I claim:

1. An element for a reverse osmosis water purfication device consisting of a semi-rigid elongate separation unit comprising
   a backing member having longitudinal peripheral surfaces and opposing ends consisting essentially of an elongate sheet of thermoplastic material having three dimensional porosity to water and having a slightly curved transverse cross-section, and
   a semi-permeable reverse osmosis membrane coating the peripheral surfaces of the backing member, said coating having been formed from a liquid solution directly on said peripheral surfaces and forming a continuous integral enclosure around the entire longitudinal peripheral surface of said member, and an opening in the membrane at an end of the element for collecting purified water passing through the membrane, said cross-section having a curvature defined by an arc subtended by radii between about 10° and 60° of circumference.

2. The element of claim 1 having a thickness less than about 5% of its width and less than about 0.5% of its length.

3. The element of claim 1 wherein the element has a cross-section having a curvature defined by an arc subtended by radii between about 20° and 45° of circumference.

4. An element for a reverse osmosis water purification device comprising a backing member fabricated from an elongate sheet of thermoplastic material having longitudinal, lateral, and transverse porosity and having a slightly curved transverse cross-section, and a semi-permeable reverse osmosis membrane coating said backing member, the element being semi-rigid and having a thickness of less than about 5% of its width and less than about 0.5% of its length, and having a length of from about 6" to 36" and a width of from 1" to 2", said backing member having a thickness of less than about 40 mils and said element having a thickness of not more than about 50 mils, said coating having been formed from a liquid solution directly on the peripheral surfaces and forming a continuous integral enclosure around the entire longitudinal peripheral surfaces of said member, said cross-section having a curvature defined by an arc subtended by radii between about 10° and 60° of circumference.

5. A reverse osmosis water purification module comprising a generally cylindrical hollow housing having enclosure means, a water inlet located tangentially to the housing, a brine outlet, and a purified water outlet, a plurality of at least twelve discrete semi-rigid reverse osmosis purification elements mounted along spaced, generally parallel axes interior of the housing, and support means for maintaining the elements in a spaced configuration such that each element is precluded from contact with another element,
   each element comprising a backing member having longitudinal peripheral surfaces and opposing ends comprised of an elongate sheet of thermoplastic material having three-dimensional porosity to water, and a semi-permeable reverse osmosis membrane coating the peripheral surfaces of the backing member, said coating having been formed from a liquid solution directly on the peripheral surfaces and forming a continuous integral enclosure around the entire longitudinal peripheral surfaces of said member, and an opening in the membrane at an end of the element for collecting purified water passing through the membrane, manifold means for accumulating purified water from end portions of each element mounted in the housing in a collection chamber, and conduit means for passing purified water from the collection chamber to the purified water outlet.

6. The module of claim 5 wherein the manifold means comprises a header having a plurality of openings therein adapted to slideably receive end portions of the elements, the cross-section of the openings corresponding to the cross-sections of the elements, and sealing means for precluding flow of impure water from the interior of the housing through the openings and into the collection chamber.

7. The module of claim 5 comprising a manifold, mounting means including a porous base for attaching end portions of the elements to the manifold, and sealing means mounted between the porous base and the interior of the housing for precluding the flow of impure water from the interior of the housing through the porous base and into the collection chamber.

8. The module of claim 7 wherein the porous base comprises a fibrous pad and the sealing means comprises a liquid potting material.

9. The module of claim 5 wherein each element comprises a backing member having a slightly curved cross-section.

* * * * *